May 4, 1943.  H. R. RICARDO  2,318,333
INTERNAL COMBUSTION ENGINE OPERATING ON THE
TWO-STROKE CYCLE WITH LIQUID FUEL INJECTION
Filed Jan. 17, 1940  4 Sheets-Sheet 1

Inventor
Harry R. Ricardo
by
Watson, Cole, Grindle
& Watson  Attorney

May 4, 1943. H. R. RICARDO 2,318,333
INTERNAL COMBUSTION ENGINE OPERATING ON THE
TWO-STROKE CYCLE WITH LIQUID FUEL INJECTION
Filed Jan. 17, 1940 4 Sheets-Sheet 3

Inventor
Harry R. Ricardo
by
Watson, Cole, Grindle & Watson
Attorney

Patented May 4, 1943

2,318,333

UNITED STATES PATENT OFFICE 2,318,333

INTERNAL COMBUSTION ENGINE OPERATING ON THE TWO-STROKE CYCLE WITH LIQUID FUEL INJECTION

Harry Ralph Ricardo, London, England

Application January 17, 1940, Serial No. 314,323
In Great Britain January 17, 1939

4 Claims. (Cl. 123—32)

This invention relates to internal combustion engines operating on the two-stroke cycle with liquid fuel injection but employing fuel which is always spark-ignited and thus distinct from engines operating with compression ignition.

According to this invention an engine operating on the two-stroke cycle is provided with a sleeve valve and has end to end scavenging the fuel being injected directly into the cylinder by a timed pump which delivers the fuel from an injector located in the end of the cylinder adjacent to the sparking plug or plugs and remote from the piston controlled scavenge ports, the character and direction of the fuel spray, the axis of which is substantially coincident with the cylinder axis, and the timing of the fuel injection causing the fuel to meet the entering air and mingle with it during the latter part of the scavenging period. Scavenge ports are formed in the sleeve which register with ports in the wall of the cylinder itself when the ports in the sleeve are uncovered by the piston. The exhaust gases flow out over the inner end of the sleeve and through ports formed in the wall of the cylinder towards its inner end. The timing of the fuel injection may be arranged so that the injection period ends at the same angular timing at all loads, but commences earlier with increased load.

The fuel injector itself may be disposed in the head of the cylinder so that the axis of the injector is coincident with the cylinder axis. For constructional reasons, however, the injector may be arranged so that its axis lies at an angle to the cylinder axis, but then the nozzle is formed so that the fuel jet itself will have its axis substantially coincident with the cylinder axis. The formation of the cylinder head and of the fuel jet itself are symmetrical with respect to the cylinder, the contour of the combustion chamber in the cylinder head varying, however, as found convenient. For example this combustion chamber may be conical or bulbous. That is to say it may comprise a bulb which is a figure of revolution about the cylinder axis and communicates with the cylinder through a somewhat constricted throat or mouth, the diameter of the latter, however, being of such size in relation to the maximum diameter of the bulb in a plane normal to the cylinder axis, and to the diameter of the cylinder that the combustion chamber falls within the category of such chambers which are designated as being in "open" communication with the cylinder, as distinct from a combustion chamber which communicates with the cylinder only through one or more relatively narrow passages.

Where the combustion chamber in the cylinder head is of a bulbous form, the diameter of the throat or mouth is such that the cone of fuel delivered from the injector along the cylinder axis will pass substantially clear through the mouth into the cylinder, avoiding as far as practicable fuel particles striking the wall of the throat. In other words the diameter of the cone of fuel where it passes through the mouth or throat is less than the minimum diameter of the mouth. Thus substantially the whole of the fuel injected will meet and mingle with the air entering the cylinder after the uncovering of the scavenge ports by the piston and as this air flows towards the inner end of the cylinder to displace the exhaust gases as they flow out over the inner end of the sleeve through the exhaust ports, which as mentioned are located at the wall of the cylinder towards its inner end.

The face of the piston may be flat or dished over the whole or greater part of its face or be otherwise formed as found desirable. The face of the piston should be symmetrical, that is to say distinct from pistons of known type having asymmetrical depressions in or projections on their faces.

The improved engine preferably operates with a compression ratio of the order of approximately 7 to 1.

The accompanying drawings illustrate by way of example two alternative constructions that may be employed in carrying the invention into practice. In these drawings—

Figure 1:
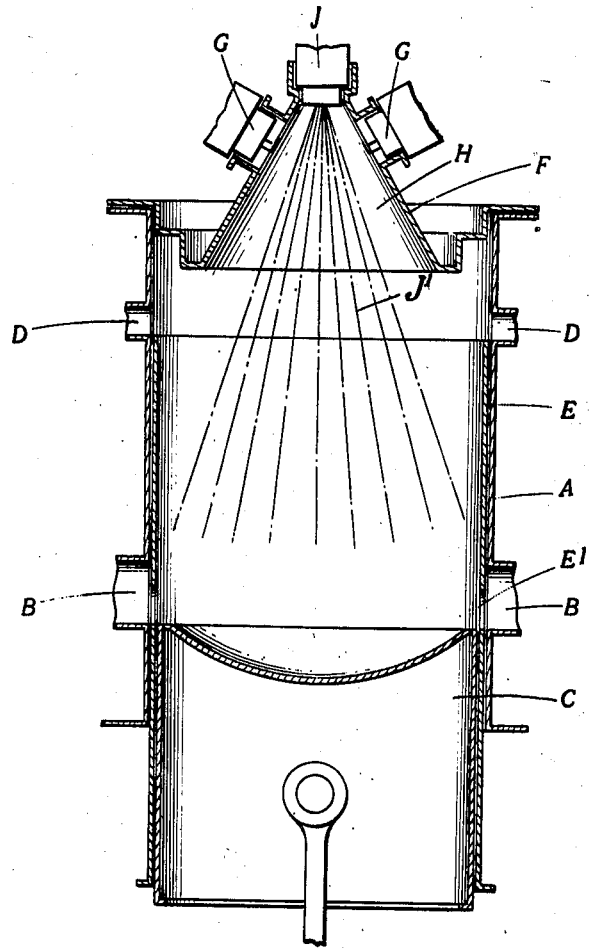
Figure 1 is a diagrammatic sectional elevation of a cylinder of the improved engine showing a construction in which the cylinder head is formed with a conical combustion chamber therein.

Referring to Figure 1 the cylinder A is provided with one or more air inlet or scavenge ports B situated where they will be uncovered by the piston C towards the end of its outstroke. These ports are preferably symmetrically arranged and lead from a scavenge air belt surrounding the cylinder. The exhaust ports D are formed in a similar way in the cylinder wall towards its inner end, these ports opening into an exhaust gas belt. The sleeve valve E has ports E¹ therein which at the proper time in the cycle will register with the scavenge ports B in the cylinder wall. The actual inflow of scavenge air is controlled by the movement of the piston C over these ports E¹ in the sleeve the dimensions of these ports being determined accordingly and broadly speaking being severally smaller than the corresponding port or ports B in the wall of the cylinder itself. The movement of the sleeve E determines the uncovering of the exhaust ports D the exhaust gases flowing out from these ports in the cylinder wall but over the end of the sleeve E.

The cylinder head F is preferably detachable and in the example shown in Figure 1 is conical with two sparking plugs G which are symmetrically, that is oppositely, disposed towards the inner and smaller end of the cone which constitutes the contour of the combustion chamber H. These plugs are thus adjacent to the fuel injector J which is mounted centrally at the inner end of the conical combustion chamber. In this case the fuel injector is mounted with its axis coincident with the cylinder axis and delivers the timed fuel jet in a cone J¹ with an apex angle of the order of approximately 30°–35°, the conical combustion chamber H having a larger apex angle, say of the order of 60°. The angles of the cone of fuel spray and of the combustion chamber are such in relation to the diameter of the cylinder A and the distance from the injector nozzle to the piston C that when the piston is on the outer dead centre the fuel, if it were then injected, would strike the face of the piston without the margin of the cone first striking the wall of the sleeve E. Thus the fuel spray will meet directly the scavenging air entering through all the scavenge ports B and will mingle with the entering air just before these ports are covered by the piston on its in-stroke, that is to say during the latter part of the scavenge period.

The scavenge ports E¹ in the sleeve E are preferably so formed that the in-flowing air is not given any circulatory motion within the cylinder due to the action or form of the sleeve ports.

By arranging the fuel injection so that the start of the injection period may be varied while maintaining constant the termination of this period, economic running is obtainable. As the load decreases and the amount of fuel injected is also decreased, it is desirable for economic reasons to cause the injection period to commence later. Conversely, to obtain greater or maximum power the period of injection should begin earlier. In each case the termination of the injection period should be fixed.

To enable this variation in the fuel injection period to be effected a fuel pump of known type may be used having a plunger which is rotatable in its cylinder for the purpose of varying the timing of the fuel injection, this rotation varying the effective length of the pump plunger, that is to say its stroke in relation to fixed ports in the cylinder wall. In the present case such a pump may be formed with the face, or other part of the plunger which determines the commencement of the injection period, inclined or with an inclined edge. On the other hand the part of the plunger which determines the end of the injection period is then constituted by a groove, edge or the like which is not inclined, but lies in a plane normal to the plunger axis. This gives a constant cut-off to the fuel delivery.

Figure 2:
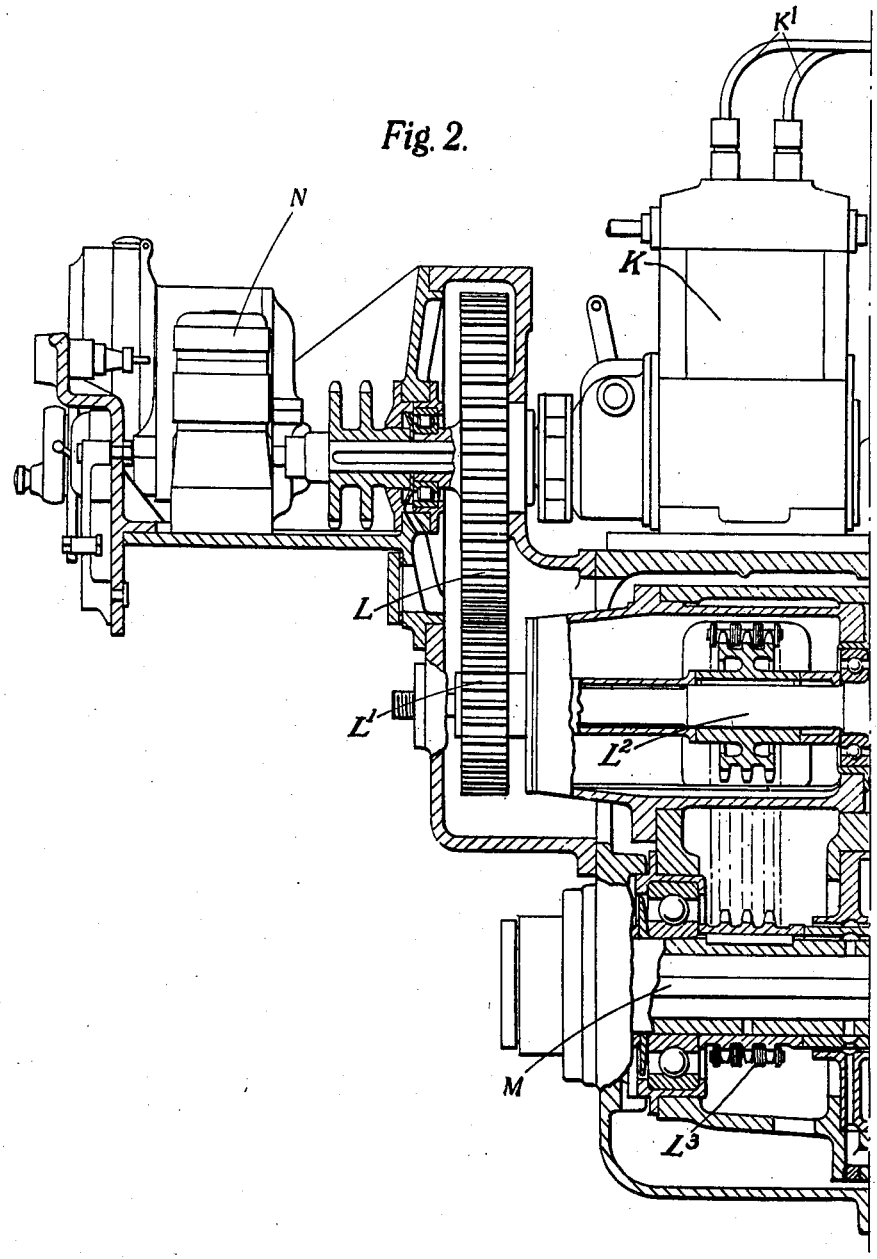
Figure 2 is a partial sectional elevation showing the gearing arrangement.
Figure 2A:
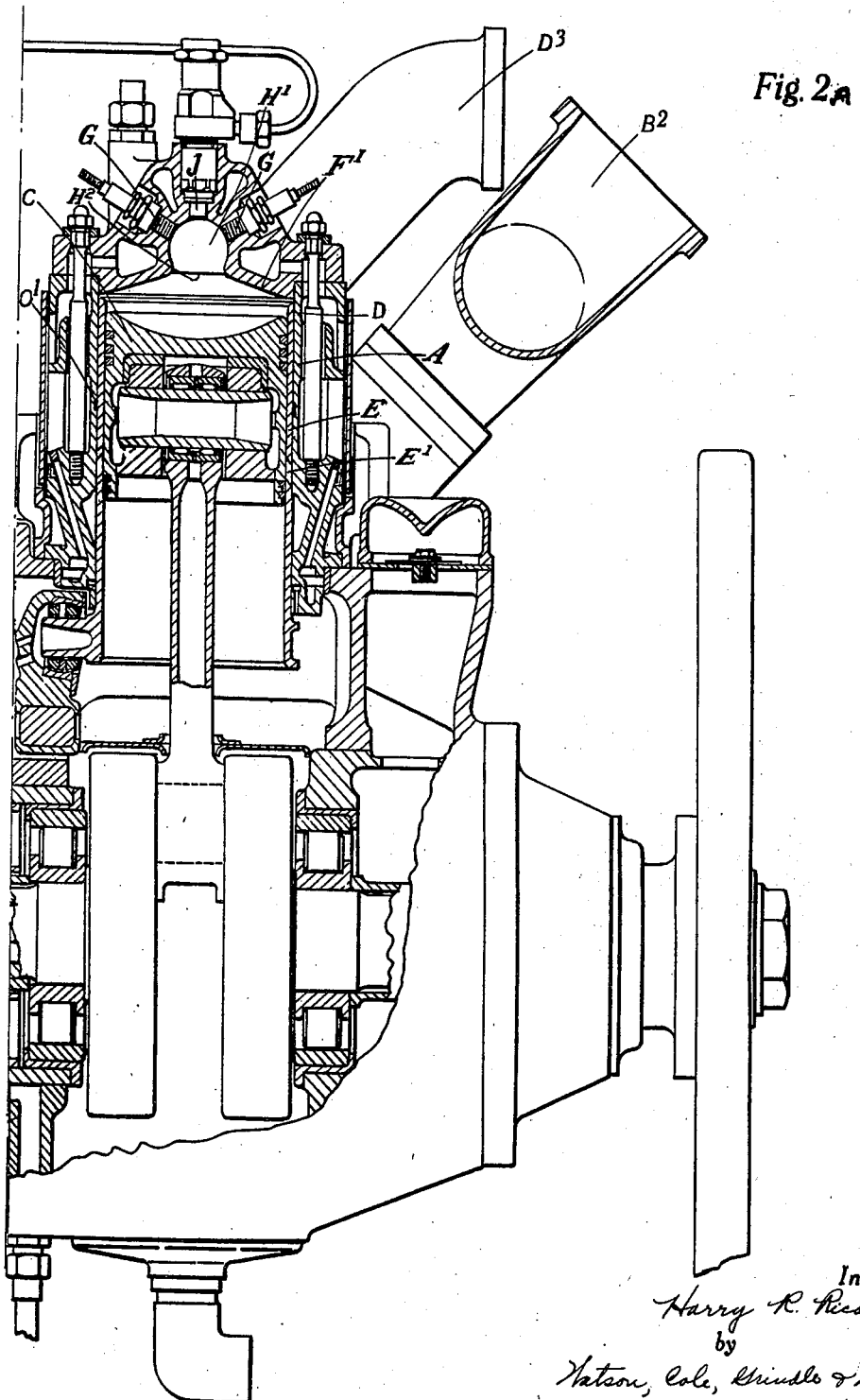
Figure 2A is a sectional elevation in the plane of the crankshaft axis showing a single cylinder engine embodying the present invention the head of the cylinder in this case having in it a combustion chamber of bulbous form.

Referring now to Figure 2A of the drawings, in the single cylinder engine here shown the cylinder A has in the head F¹ a combustion chamber H¹ of bulbous form. That is to say the chamber in this instance is substantially spherical having a large mouth H² which gives open communication between the chamber and the end of the cylinder. The diameter of this mouth H² is less than the maximum diameter of the chamber H¹ and the cone of fuel delivered into the chamber by the centrally placed injector J has a diameter less than the diameter of the mouth H² where this fuel cone passes through the mouth into the cylinder. Two sparking plugs G are conveniently arranged oppositely in the chamber H¹ and symmetrically with respect to the cylinder axis, the centre of the bulbous chamber lying in this axis.

The face of the cylinder head F¹ around the mouth H² of the combustion chamber H¹ is slightly conical. The face of the piston C is conveniently dished as shown.

Figure 3:
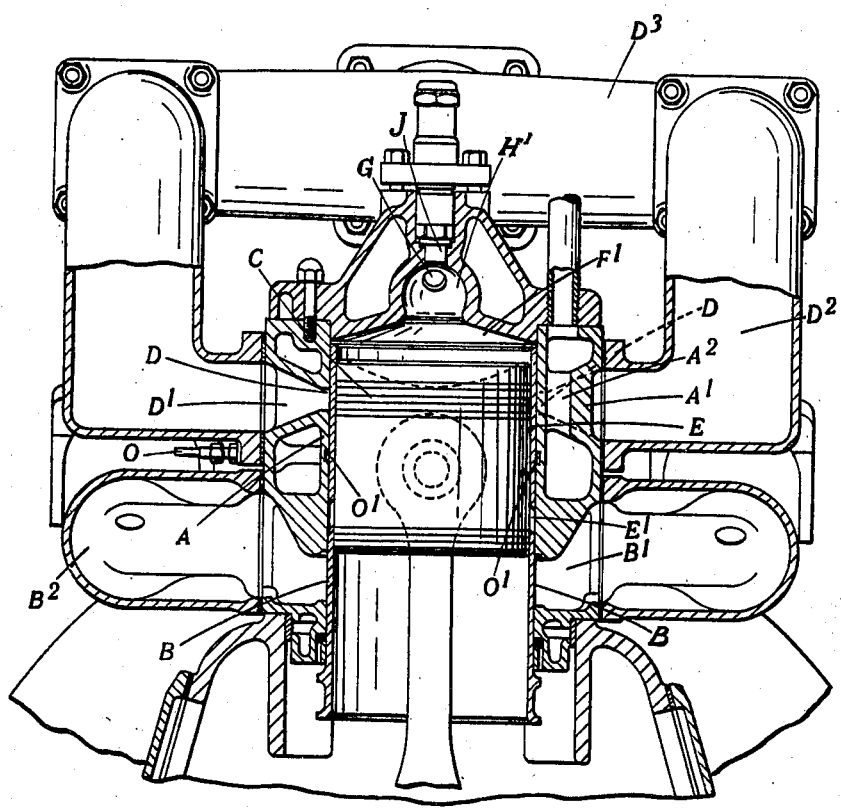
Figure 3 is a sectional elevation in a plane at right angles to the plane of Figure 2 showing the same construction as is illustrated in Figure 2.

The scavenge air enters by way of the passage B² into the scavenge air belt B¹ and passes thence through the ports B when the ports E¹ in the sleeve E register with these scavenging air ports and the ports in the sleeve are uncovered by the piston. The air thus entering the cylinder meets the cone of injected fuel which mingles with the air. The exhaust gases pass out over the top edge of the sleeve valve E and by way of the ports D in the wall of the cylinder A into the exhaust gas belt D¹ whence these gases pass away through the manifold D², D³ (see Figure 3).

The fuel pump K which is conveniently of some known type has two cylinders the plungers in which are actuated by cams arranged at 180° apart so that when fuel is being delivered by the one plunger through one of the delivery pipes K¹ to the injector J, the other pump cylinder is being charged by the plunger in that cylinder which is moving in the opposite direction. The pump is driven at half engine speed and the drive conveniently comprises the gear wheels L, L¹ the latter being on a shaft L² driven by a chain L³ from the engine crankshaft M. This arrangement enables the engine to be run at a higher speed than that at which the pump will function satisfactorily while the pump will deliver an injection of fuel into the cylinder at every revolution of the crankshaft. The magneto N is driven through the chain L³ and gear wheels L, L¹ by means of which the pump is driven as described above.

The cylinder casting A in which are the exhaust ports D may have between these ports bars A¹ extending in the direction of the cylinder length these bars being cooled by water passages A² through them. Owing to the movements of the sleeve E the bars A¹ serve to carry lubricant from that part of the cylinder bore which lies below the exhaust ports D to the part of that bore which lies above these ports.

The lubrication of the cylinder bore is effected by supplying oil by way of the pipe O to the annular groove O¹ in the wall of the cylinder.

With regard to the timing of the fuel injection, it is desirable to provide means by which the proper proportions of air and fuel are maintained, but the apparatus for effecting this does not form part of the present invention.

What I claim as my invention and desire to secure by Letters Patent is:

1. A sleeve valve internal combustion engine operating on the two-stroke cycle comprising in combination a cylinder, a piston therein, circumferentially spaced ports in the wall of the cylinder and in the sleeve valve which are uncovered by the piston towards the end of its outstroke, means for delivering scavenge air through these ports into the cylinder, said ports being so constructed and arranged as to impart to the admitted air no substantial rotative effect, ports in the wall of the cylinder through which exhaust gases flow, said last named ports being uncovered by the inner end of the sleeve valve, a combustion chamber in the head of the cylinder, a fuel injector centrally situated in this combustion chamber and which injects fuel into the cylinder from the inner end thereof as spray in the form of a hollow cone whose axis is substantially coincident with the cylinder axis, at least one sparking plug by means of which the fuel charge is always ignited, said plug being mounted in the combustion chamber in the cylinder head, and a fuel pump delivering fuel to the said injector with such timing that the cone of fuel spray will meet and mingle with the air entering the cylinder through the scavenge ports during the latter part of the scavenging period as set forth.

2. A sleeve valve internal combustion engine operating on the two-stroke cycle comprising in combination a cylinder, a piston therein the face of which is formed symmetrical about the cylinder axis, circumferentially spaced ports in the wall of the cylinder and in the sleeve valve which are uncovered by the piston towards the end of its outstroke, means for delivering scavenge air into an air belt around the cylinder and thence to these ports, said ports being so constructed and arranged as to impart to the admitted air no substantial rotative effect, ports in the wall of the cylinder through which exhaust gases flow, said last named ports being uncovered by the inner end of the sleeve valve, a combustion chamber having a bulbous form which is a figure of revolution about the cylinder axis this chamber opening into the end of the cylinder by way of a mouth whose diameter is less than the maximum diameter of the chamber but more than half that diameter, a fuel injector centrally situated in this combustion chamber and which injects fuel into the cylinder from the inner end thereof as spray in the form of a hollow cone whose axis is substantially coincident with the cylinder axis, the diameter of this spray cone where it passes through the mouth of the combustion chamber being less than the minimum diameter of that mouth, at least one sparking plug by means of which the fuel charge is always ignited, said plug being mounted in the said combustion chamber, and a fuel pump delivering fuel to the said injector with such timing that the cone of fuel spray will meet and mingle with the air entering the cylinder through the scavenge ports during the latter part of the scavenging period as set forth.

3. A method of operating on the two-stroke cycle a sleeve valve internal combustion engine, comprising the steps of admitting scavenge air into the engine cylinder adjacent the outer end thereof in such manner as to establish no substantial rotation of the air within the cylinder, discharging exhaust gases from the cylinder adjacent the inner end thereof, injecting fuel directly into the cylinder and axially thereof from the inner end during the latter part of the scavenging period, and so as to cause the fuel to meet and mingle with the incoming air, spark-igniting the fuel, and varying the instant of initiation of fuel injection in accordance with variation in engine load without substantial variation in the instant of termination of injection.

4. A method of operating on the two-stroke cycle a sleeve valve internal combustion engine, comprising the steps of admitting scavenge air into the engine cylinder adjacent the outer end thereof in such manner as to establish no substantial rotation of the air within the cylinder, discharging exhaust gases from the cylinder adjacent the inner end thereof, injecting fuel directly into the cylinder and axially thereof from the inner end during the latter part of the scavenging period, so as to form an axially directed hollow cone of spray, to cause the fuel to meet and mingle with the incoming air, spark-igniting the fuel, and varying the instant of initiation of fuel injection in accordance with variation in engine load without substantial variation in the instant of termination of injection.

HARRY RALPH RICARDO.